US010581089B2

(12) United States Patent
Blanchet et al.

(10) Patent No.: US 10,581,089 B2
(45) Date of Patent: Mar. 3, 2020

(54) OPEN FLOW FIELD FUEL CELL

(75) Inventors: Scott C. Blanchet, Chelmsford, MA (US); James C. Cross, III, Carlisle, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 558 days.

(21) Appl. No.: 12/722,051

(22) Filed: Mar. 11, 2010

(65) Prior Publication Data

US 2011/0223514 A1 Sep. 15, 2011

(51) Int. Cl.
*H01M 8/0258* (2016.01)
*H01M 8/241* (2016.01)
*H01M 8/2457* (2016.01)
*H01M 8/04082* (2016.01)

(52) U.S. Cl.
CPC ..... *H01M 8/0258* (2013.01); *H01M 8/04201* (2013.01); *H01M 8/241* (2013.01); *H01M 8/2457* (2016.02)

(58) Field of Classification Search
CPC .......................... H01M 8/0258; H01M 8/04201
See application file for complete search history.

(56) References Cited

U.S. PATENT DOCUMENTS

| | | | |
|---|---|---|---|
| 5,565,072 A | 10/1996 | Faita et al. | |
| 5,910,378 A * | 6/1999 | Debe et al. | 429/483 |
| 6,146,780 A * | 11/2000 | Cisar et al. | 429/435 |
| 6,322,919 B1 | 11/2001 | Yang et al. | 429/457 |
| 6,492,055 B1 * | 12/2002 | Shimotori et al. | 429/435 |
| 7,189,468 B2 * | 3/2007 | Izenson et al. | 429/444 |
| 2002/0182472 A1 | 12/2002 | Molter et al. | |
| 2005/0089745 A1* | 4/2005 | Sugita et al. | 429/35 |
| 2006/0024556 A1* | 2/2006 | Ishioka et al. | 429/37 |
| 2006/0286432 A1* | 12/2006 | Rakowski et al. | 429/38 |
| 2009/0136802 A1 | 5/2009 | Sasaki et al. | |
| 2009/0291350 A1* | 11/2009 | Ishida | H01M 8/0247 429/499 |
| 2010/0009233 A1* | 1/2010 | Blanchet et al. | 429/30 |

FOREIGN PATENT DOCUMENTS

| | | |
|---|---|---|
| CN | 1378710 A | 11/2002 |
| JP | 2006-196426 | 7/2006 |
| JP | 2006-228753 | 8/2006 |
| JP | 2006-331783 | 12/2006 |
| JP | 2007-305325 A | 11/2007 |
| JP | 2009-283267 | 12/2009 |
| WO | WO 2008/072363 A1 | 6/2008 |
| WO | WO 2009/157981 A1 | 12/2009 |

OTHER PUBLICATIONS

PCT International Search Report and Written Opinion issued in PCT/US2010/027004, dated Sep. 24, 2010, 11 pages.
First Office Action issued in Chinese Patent Application No. 2010800652382 dated Jun. 27, 2014, 5 pages.
Office Action in Japan Patent Application No. 2012-557023, dated Oct. 11, 2013.
Second Office Action issued in Chinese Patent Application No. 2010800652382 dated Mar. 10, 2015.
Final Office Action issued in Japanese Patent Application No. 2012-557023 dated Jul. 8, 2014.
Decision to Grant Patent in Japanese Patent Application No. 2012-557023 dated Oct. 20, 2014, with English translation (6 pages).
First Office Action issued in Canadian Patent Application No. 2,790,538 dated Jan. 28, 2016 (3 pages).
Second Office Action issued in Canadian Patent Application No. 2,790,538 dated Oct. 11, 2016 (4 pages).
Notice of Allowance issued in Canadian Patent Application No. 2,790,538 dated Sep. 25, 2017 (1 page).
Third Office Action issued in Chinese Patent Application No. 2010800652382 dated Sep. 2, 2015, with English translation (10 pages).
Fourth Office Action issued in Chinese Patent Application No. 2010800652382 dated May 16, 2016, with English translation (15 pages).
Notification to Grant Patent issued in Chinese Patent Application No. 2010800652382 dated Nov. 9, 2016, with English translation (3 pages).
Intention to Grant issued in European Application EP 10712203 dated Nov. 25, 2016 (46 pages).
Notice of Preliminary Rejection issued in Korean Patent Application No. 10-2012-7026225 dated Sep. 21, 2016, with English translation (12 pages).
Written Decision on Registration, Grant of Patent issued in Korean Patent Application No. 10-2012-7026225 dated Mar. 29, 2017, with English translation (3 pages).
Office Action issued in Brazilian Patent Application No. BR112012020414-9 dated Dec. 10, 2018, (9 pages).

* cited by examiner

*Primary Examiner* — Ladan Mohaddes
(74) *Attorney, Agent, or Firm* — Finnegan, Henderson, Farabow, Garrett & Dunner, LLP (57) ABSTRACT

Provided is a polymer electrolyte membrane fuel cell stack, comprising a first bipolar plate, a second bipolar plate, an electrochemical package comprising a cathode, an anode, and a polymer membrane interposed between the cathode and the anode, an anode compartment disposed between the first bipolar plate and the anode, the anode compartment comprising at least one inlet and at least one outlet, a cathode compartment disposed between the second bipolar plate and the cathode, the cathode compartment comprising at least one inlet and at least one outlet, and wherein the geometric area of the anode compartment is larger than the geometric area of the anode. Also provided is a polymer electrolyte membrane fuel cell stack, comprising a first bipolar plate, a second bipolar plate, an electrochemical package comprising a cathode, an anode, and a polymer membrane interposed between the cathode and the anode, an anode compartment disposed between the first bipolar plate and the anode, the anode compartment comprising at least one inlet and at least one outlet, a cathode compartment disposed between the second bipolar plate and the cathode, the cathode compartment comprising at least one inlet and at least one outlet, and wherein the geometric area of the cathode compartment is larger than the geometric area of the cathode.

36 Claims, 5 Drawing Sheets

OPEN FLOW FIELD FUEL CELL

The present disclosure is generally related to the field of polymer electrolyte membrane fuel cells.

A typical polymer electrolyte membrane ("PEM") fuel cell comprises a electrochemical package (ECP), which comprises a polymer membrane that serves as an electrolyte, an anode on one side of the polymer membrane, and a cathode on the other side of the membrane. The anode comprises an anode electrode catalyst. The reactant from the fuel gas, e.g., hydrogen, comes into contact with the anode electrode catalyst and may dissociate to produce protons. The polymer membrane, when adequately hydrated, allows protons to migrate across the membrane from the anode to the cathode. The cathode comprises a cathode electrode catalyst. The reactant from the cathode gas, e.g., oxygen, may form activated oxygen species on the cathode electrode catalyst, which react with the protons to form water. Such single fuel cells can be connected electrically in series to form a "fuel cell stack."

The present disclosure provides a polymer electrolyte membrane fuel cell stack, which comprises a first bipolar plate, a second bipolar plate, an electrochemical package (ECP) comprising a cathode, an anode, and a polymer membrane interposed between the cathode and the anode. The ECP is disposed between the first and the second bipolar plate.

According to the disclosure, the polymer electrolyte membrane fuel cell stack comprises an anode compartment disposed between the first bipolar plate and the anode, as well as an cathode compartment disposed between the second bipolar plate and the cathode. The anode compartment comprises at least one inlet and at least one outlet so that the gas may enter and exit the compartment. In certain embodiments, the geometric area of the anode compartment is larger than the geometric area of the anode. In other embodiments, the geometric area of the cathode compartment is larger than the geometric area of the cathode. In further embodiments, the geometric area of the anode compartment is larger than the geometric area of the anode, and the geometric area of the cathode compartment is larger than the geometric area of the cathode.

In certain embodiments, there is a flowfield disposed inside the anode and/or the cathode compartment, and this flowfield may be chosen from, for example, a formed metal sheet with perforations, a metal foam, a graphite foam, an expanded metal mesh, a metal wire mesh, and a sintered porous metal sheet.

In certain other embodiments, the flowfield disposed inside the anode compartment and/or the cathode compartment may comprise at least two elements chosen from a formed metal sheet with perforations, a metal foam, a graphite foam, an expanded metal mesh, a metal wire mesh, and a sintered porous metal sheet.

In a further embodiment of the fuel cell disclosed herein, the first bipolar plate is a formed metal sheet without perforation. Examples of such a formed sheet include a formed metal sheet that comprises of protrusions in direct contact with the anode.

In some embodiments of the fuel cell stack according to the present disclosure, the geometric area of the anode is the same as the geometric area of the cathode. In other embodiments, the geometric area of the anode is different from the geometric area of the cathode.

As disclosed herein, a membrane electrode assembly ("MEA") comprises a polymer membrane that comprises an anode on one side and a cathode on the reverse side. A conductive medium known as a gas diffusion layer ("GDL") can be attached or situated adjacent to either or both of the two sides of the MEA. The gas diffusion layer can be made of carbon paper, graphite cloth, or other porous, flexible, and electrically conductive materials, or composite assemblages thereof.

In certain embodiments, an electrode catalyst can be applied directly on the surface of the polymer membrane. In additional embodiments, the electrode catalyst can be incorporated into catalyst layer adjacent to the polymer membrane. Alternatively, the electrode catalyst can be applied on a gas diffusion layer, which is then chemically attached, mechanically attached, or placed adjacent to the polymer membrane, so that the electrode catalyst is interposed between the gas diffusion layer and the polymer membrane. In certain embodiments, the gas diffusion layer is not needed for the fuel cell to function.

As disclosed herein, an electrochemical package ("ECP") refers to a component comprising an MEA: (1) with gas diffusion layers attached to both sides; (2) with only one gas diffusion layer attached to one side; or (3) without a gas diffusion layer attached to it. Accordingly, the anode refers to the part of the ECP that contains the anode catalyst, and the cathode refers to the part of the ECP that contains the cathode catalyst, with or without a gas diffusion layer attached to it. An electrode refers to the anode or the cathode.

As used herein, the anode is exposed to a fuel gas (i.e., the anode gas) in a fuel cell. The reactant from the fuel gas, e.g., hydrogen, may experience catalytic reactions when coming into contact with the anode catalyst.

As used herein, the cathode is exposed to an oxidant gas (i.e., the cathode gas). The reactant from the cathode gas, e.g., oxygen, may experience catalytic reaction when coming into contact with the cathode catalyst.

As used herein, a fuel cell component is in direct contact with an electrode of the ECP if it can be in direct contact with the catalyst, in direct contact with the catalyst layer, or in direct contact with the gas diffusion layer. As used herein, the geometric area of an anode or a cathode refers to the projected, planar area of the portion of the polymer membrane that is covered by or otherwise in direct contact with an electrode catalyst, commonly referred to by those in the fuel cell industry as the active area of the anode or cathode.

As used herein, a separator plate, also known as a bipolar plate, refers to an electrically conductive gas barrier. The bipolar plate can be comprised of, for example, graphite or metal. The anode compartment refers to the space between a first bipolar plate and the anode, while the cathode compartment refers to the space between a second bipolar plate and the cathode. As used herein, a fuel cell compartment refers to either an anode compartment or a cathode compartment.

A fuel cell compartment can be enclosed at its periphery in the planar direction by a gas seal. The gas seal has openings that serve as gas inlets or outlets for the fuel cell compartment. The inlets and outlets of the compartment are fluidly connected to gas manifolds, which are fluid conduits connecting the inlets and a gas source, or connecting the outlets and a gas exit point. An example of a gas seal is a gasket with openings that allows gas to enter or exit the anode or cathode compartment.

As used herein, a flowfield is a structural element disposed between an ECP and a bipolar plate in a planar orientation in parallel with the bipolar plate, which allows gas to flow through and is enclosed at its periphery by a gas seal having inlets and outlets from one or more gas manifolds. Without structural support, a fuel cell compartment may collapse under pressure during the assembly of the fuel cell stack, making a significant portion of the electrode inaccessible to the reactant gas. A flowfield should thus have a certain degree of structural integrity so that it does not completely collapse under pressure.

A flowfield should also facilitate the even distribution of the reactant gas to the electrode. The contacting area between the flowfield and the electrode should be small so that most area of the electrode is accessible to the reactant gas but still maintain good electrical conductivity. Furthermore, it is desirable that the flowfield does not create excessive pressure drop in the reactant gas flow.

An open flowfield refers to a structure in which any point within flowfield may belong to several fluid pathways, i.e., multiple fluid pathways intersect at that point. For example, in an open flowfield, a fluid can follow two or more pathways from any point within the flowfield to an outlet. In contrast, in a flowfield that has discrete channels linking an inlet and an outlet, the fluid in one channel may only follow one pathway, defined by that channel, to the outlet.

One material suitable as an open flowfield is a porous foam. A piece of foam has a reticulated structure with an interconnected network of ligaments and interconnected voids within the geometric boundary defined by the contour of the metal foam. Because of this unique structure, the foam material in an uncompressed state can have a porosity that reaches greater than 50%, such as, for example, greater than 60%, greater than 70%, greater than 75%, greater than 80%, greater than 85%, greater than 90%, greater than 95%, and greater than 98%.

The network of interconnected voids form pathways that extend throughout the foam. Accordingly, a fluid entering the porous structure at one point on its geometric boundary may follow several different pathways to reach a location inside or at another boundary of the foam. The foam may be made of metal or graphite. For example, metal foams are commercially available from Porvair Advanced Materials, Inc. Graphite foams are also commercially available, for example, from Poco Graphite, Inc., Decatur, Tex.

Another example of porous structures suitable as an open flowfield include expanded metal mesh. An expanded metal mesh is made from sheets of solid metal that are uniformly slit and stretched to create openings of certain geometric shapes, e.g., a diamond shape. In a standard expanded metal, each row of diamond-shaped openings is offset from the next, creating an uneven structure. The standard expanded metal sheet can be rolled to produce a flattened expanded metal. A metal wire mesh is also a porous structure suitable as an open flowfield. It can be made by weaving or welding metal wires together. Both metal wire mesh and expanded metal mesh are commercially available, for example, from Mechanical Metals, Inc. of Newtown, Pa. When used as an open flowfield, the expanded metal mesh and the metal wire mesh may first be processed to form a non-flat geometric shape.

A further example of a porous structure suitable as an open flowfield is a formed metal sheet with perforations. As used herein, a formed metal sheet refers to a metal sheet that has a non-flat geometric shape. It may have a raised or embossed surface. It may be a corrugated metal sheet with undulating ridges and grooves. It may also have discontinuous indentations and protrusions.

Once provided with a sufficient number of perforations, a formed metal sheet may be used as an open flowfield, allowing fluids to flow in the fuel cell compartment with little restriction. Such a perforated metal sheet may have repeated arrays of perforations, e.g., round holes, hexagonal holes, square holes, slotted hole, etc. It can be stamped to form undulating ridges and grooves, or indentations and protrusions, or other geometric shapes. An example of perforated metal sheets that are commercially available can be obtained from McNichols Co., Tampa, Fla.

A formed metal sheet without perforations may also serve as an open flowfield. One example is a formed metal sheet having arrays of protrusions. The tips of the protrusions contact the ECP, creating a continuous void space between the ECP and the rest of the metal sheet. As a result, a fluid can travel from one point in the continuous void to another through multiple pathways. In this case, the formed metal sheet can be interposed between the bipolar plate and the ECP. However, the bipolar plate itself can be a formed metal sheet so that it functions both as a gas separator and a flowfield.

A formed metal sheet may be made by a sheet metal forming process such as stamping. It may also form channels by removing part of the surface material, such as by etching and laser engraving, so that the thickness of the metal sheet varies. Enclosed channels may form between the raised surface of a formed metal sheet with an adjacent flat surface, such as an ECP.

In contrast to open flowfields, some non-open flowfields contain a plurality of discrete flow pathways that are physically separated and distinct from one another. An example of the latter is a graphite bipolar plate having discrete channels molded on its surface. Each channel connects an inlet with an outlet of the fuel cell compartment. In such a case, the ridges and valleys of the channels create a space between the bulk structure of the bipolar plate and the ECP, forming an enclosed pathway for the fluid to pass through. In this structure, aside from gas diffusion into the ECP, the bulk of the gas fluid flows within the channel from inlet to the outlet. The arrangement of channels may vary, for example, a channel may split into multiple channels and multiple channels may merge into one, therefore creating locations in the flowfield where multiple channels intersect. However, the number of such locations are finite, and in the majority of the flowfield the gas fluid has only one pathway, which is defined by the section of channel where the gas fluid resides.

As used herein, the shape of the fuel cell compartment refers to the shape of the compartment in the planar direction. It may be of any two-dimensional shape, for example, polygonal, curvilinear, or a combination thereof. The geometric area of the fuel cell compartment is the area of the anode or the cathode compartment in the planar direction. When a gasket is used to seal the fuel cell compartment (but leaving open certain inlets and outlets for the fluid), both the geometric shape and the geometric area of the fuel cell compartment are determined by the shape and size of the hollow center portion of the gasket.

In some embodiments of the present disclosure, the shape of the fuel cell compartment is substantially rectangular, meaning that the shape may be quadrilateral with four right angles, but also including those embodiments in which the one or more of the four corners of the rectangle are rounded. In certain embodiments, the inlets of the fuel cell compartment can be located at one side of the rectangle while the outlets are located on the opposite side.

In other embodiments of the present disclosure, the shape of the fuel cell compartment is curvilinear, e.g., circular, oval, or oblong. The fuel cell compartment may also be configured to have a hollow portion in the center, e.g., in the shape of a ring. However, the hollow portion as well as the outer periphery of the fuel cell compartment may adopt any shape, rectangular or curvilinear. In these designs, inlets of the fuel cell compartment may be located at the periphery of the hollow portion and the outlets may be located at the outer periphery, or vice versa.

In certain embodiments of the fuel cell stack disclosed herein, the geometric area of the anode compartment is larger than the geometric area of the anode. In other embodiments, the geometric area of the cathode compartment is larger than the geometric area of the cathode. In additional embodiments, the geometric area of the anode and/or cathode compartment is the same as the geometric area of the anode and/or cathode, respectively. For example, the geometric area of the fuel cell compartment may range from 2 $cm^2$ to 2400 $cm^2$ while the geometric area of the electrode may range from 2 $cm^2$ to 2000 $cm^2$.

Thus, the geometric area of the fuel cell compartment may for example range in certain embodiments from 25 $cm^2$ to 2000 $cm^2$, such as from 50 $cm^2$ to 1500 $cm^2$, from 75 $cm^2$ to 1250 $cm^2$, from 100 $cm^2$ to 1000 $cm^2$, from 150 $cm^2$ to 750 $cm^2$, from 175 $cm^2$ to 500 $cm^2$, and from 200 $cm^2$ to 350 $cm^2$. In other embodiments, the geometric area of the fuel cell compartment may range, for example, from 2 $cm^2$ to 100 $cm^2$, such as from 5 $cm^2$ to 75 $cm^2$, from 10 $cm^2$ to 50 $cm^2$, and from 15 $cm^2$ to 35 $cm^2$. In additional embodiments, the geometric area of the fuel cell compartment may range, for example, from 800 $cm^2$ to 2000 $cm^2$, such as from 900 $cm^2$ to 1700 $cm^2$, from 1000 $cm^2$ to 1500 $cm^2$, and from 1100 $cm^2$ to 1300 $cm^2$.

Similarly, the geometric area of the electrode may for example range in certain embodiments from 25 $cm^2$ to 2000 $cm^2$, such from 50 $cm^2$ to 1500 $cm^2$, from 75 $cm^2$ to 1250 $cm^2$, from 100 $cm^2$ to 1000 $cm^2$, from 150 $cm^2$ to 750 $cm^2$, from 175 $cm^2$ to 500 $cm^2$, and from 200 $cm^2$ to 300 $cm^2$. In other embodiments, the geometric area of the fuel cell compartment may range, for example, from 2 $cm^2$ to 100 $cm^2$, such as from 5 $cm^2$ to 75 $cm^2$, from 10 $cm^2$ to 50 $cm^2$, and from 15 $cm^2$ to 35 $cm^2$. In additional embodiments, the geometric area of the fuel cell compartment may range, for example, from 600 $cm^2$ to 2000 $cm^2$, such as from 700 $cm^2$ to 1500 $cm^2$, from 800 $cm^2$ to 1300 $cm^2$, and from 900 $cm^2$ to 1100 $cm^2$.

In an embodiment of the fuel cell stack disclosed herein, assuming a shortest distance between any of the at least one inlet of the anode compartment and the anode is m and the shortest distance between the same at least one inlet of the anode compartment and at least one outlet of the anode compartment is L, the value of m/L ranges from 1% to 30%. Furthermore, this value may range from, for example, 1% to 20%, from 1% to 15%, from 2% to 25%, from 2% to 20%, from 2% to 15%, from 2% to 10%, from 3% to 20%, from 3% to 15%, from 3% to 10%, from 4% to 15%, from 4% to 10%, from 4% to 8%, from 5% to 12%, from 5% to 8%, and from 6% to 10%.

In another embodiment disclosed herein, assuming a shortest distance between any of the at least one outlet of the anode compartment and the anode is n and the shortest distance between any of the at least one inlet of the anode compartment and the same at least one outlet of the anode compartment is L, the value of n/L ranges from 1% to 30%. Furthermore, this value may range from, for example, 1% to 20%, from 1% to 15%, from 2% to 25%, from 2% to 20%, from 2% to 15%, from 2% to 10%, from 3% to 20%, from 3% to 15%, from 3% to 10%, from 3% to 8%, and from 3% to 6%.

In an additional embodiment of the fuel cell stack disclosed herein, when the shortest distance between any of the at least one inlet of the cathode compartment and the cathode is m and the shortest distance between the same at least one inlet of the cathode compartment and at least one outlet of the cathode compartment is L, the value of m/L ranges from 1% to 30%, for example, from 1% to 20%, from 1% to 15%, from 2% to 25%, from 2% to 20%, from 2% to 15%, from 2% to 10%, from 3% to 20%, from 3% to 15%, from 3% to 10%, from 4% to 15%, from 4% to 10%, from 4% to 8%, from 5% to 12%, from 5% to 8%, and from 6% to 10%.

In a further embodiment disclosed herein, when a shortest distance between any of the at least one outlet of the cathode compartment and the cathode is n and the shortest distance between any of the at least one inlet of the cathode compartment and the same at least one outlet of the cathode compartment is L, the ratio of n/L ranges from 1% to 30%, for example, from 1% to 20%, from 1% to 15%, from 2% to 25%, from 2% to 20%, from 2% to 15%, from 2% to 10%, from 3% to 20%, from 3% to 15%, from 3% to 10%, from 3% to 8%, and from 3% to 6%.

As used herein, the shortest distance between an inlet and the anode or between an inlet and an outlet means the shortest distance that the fluid can travel from the inlet to the anode or outlet. Accordingly, when there is no barrier between the anode and a certain inlet, the shortest distance is the length of the shortest straight line linking the anode and the inlet. Likewise, assuming there is no barrier between an inlet and an outlet of a fuel cell compartment, the shortest distance is the length of the straight line linking the inlet and the outlet. However, if there is a barrier intersecting that straight line, the gas flow has to travel around the barrier, adding distance of the gas flow to the travel distance between the inlet and the outlet. In case of an open flowfield, such as with metal foam, where the porosity is high (e.g., larger than 50%) and the length scale of the structural material (i.e., the diameter of the ligament in a metal foam) is small (e.g., on the order of millimeters or less, for example ranging from 1 to 500 microns), the extra distance that the fluid travels to circumvent the structural material may be negligible.

In certain embodiments of the fuel cell stack disclosed herein, the flowfield may fill the entire fuel cell compartment. In this case, the shape and the geometric area of the flowfield is substantially the same as the fuel cell compartment. In certain other embodiments, the flowfield may occupy only a portion of the fuel cell compartment, leaving certain space within the compartment unfilled. In further embodiments, the flowfield may comprise different materials. For instance, one section of the flowfield may comprise a metal foam while others may contain a metal screen, a metal mesh, an expanded metal sheet, a graphite foam, a formed metal sheet with or without perforations, or a sintered porous metal sheet.

Figure 1A:
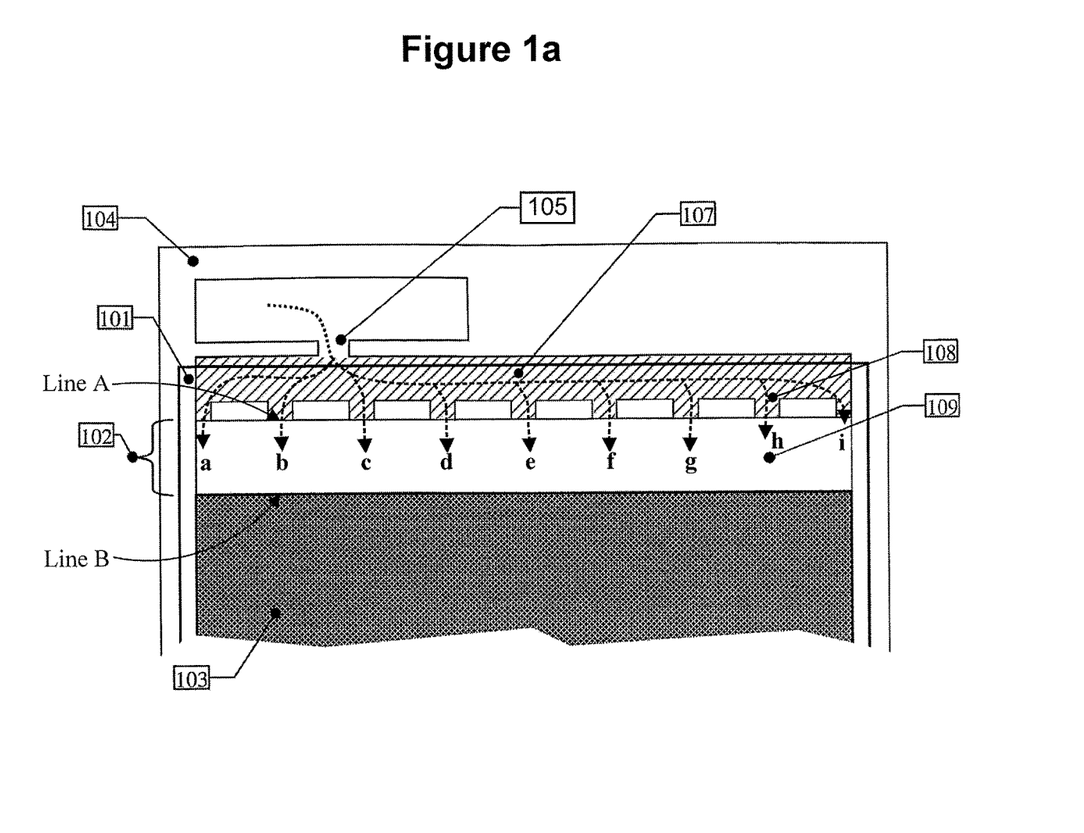
FIGS. 1a-1c illustrate certain embodiments of the fuel cell stack provided in this disclosure.

FIG. 1a illustrates an embodiment of the fuel cell stack disclosed herein. Part 104 represents a gasket. Part 101 represents an ECP, which is placed in front of Part 104. The shaded area 103 represents the anode that is on the side of the ECP 101 that is away from the viewer. For the purpose of illustration, the ECP 101, other than the area of the anode 103, is shown to be transparent. A bipolar plate, not shown in FIG. 1a for simplicity, is located behind the gasket 104.

In this embodiment, the gasket 104 has a hollow center portion, while the ECP 101 and the bipolar plate have flat surfaces. In an assembled fuel cell, the ECP 101, the gasket 104, and the bipolar plate are pressed together, enclosing the center portion of the gasket 104 to form an anode compartment 109.

The shaded area 107 recedes from the rest of the surface of the gasket 104 and, when pressed against the ECP 101, forms a channel. Channel 107 has a series of openings 108a-108i arranged in the shape of a comb. The anode gas enters channel 107 through opening 105. It flows from channel 107 into the anode compartment 109 through openings 108a-108i. Therefore, openings 108a-108i are the inlets of the anode compartment.

As shown in FIG. 1a, the anode 103 and the openings 108a-108i are not adjacent to each other. All the tips of openings 108a-108i reside on Line A while the periphery of the anode is on Line B. In this case, Line A and Line B are substantially parallel so that the shortest distance between them is an imaginary line perpendicular to both Line A and Line B, the length of which is shown as 102.

Furthermore, since Line A and Line B are parallel in this embodiment, the shortest distance from any of the openings 108a-108i to the anode is the same. This would not be true, however, in embodiments of fuel cell stacks where Line A and Line B are not parallel and/or are curvilinear. In those cases, it could be that only one of the inlet to the anode compartment can have the shortest distance to the anode.

Figure 1B:
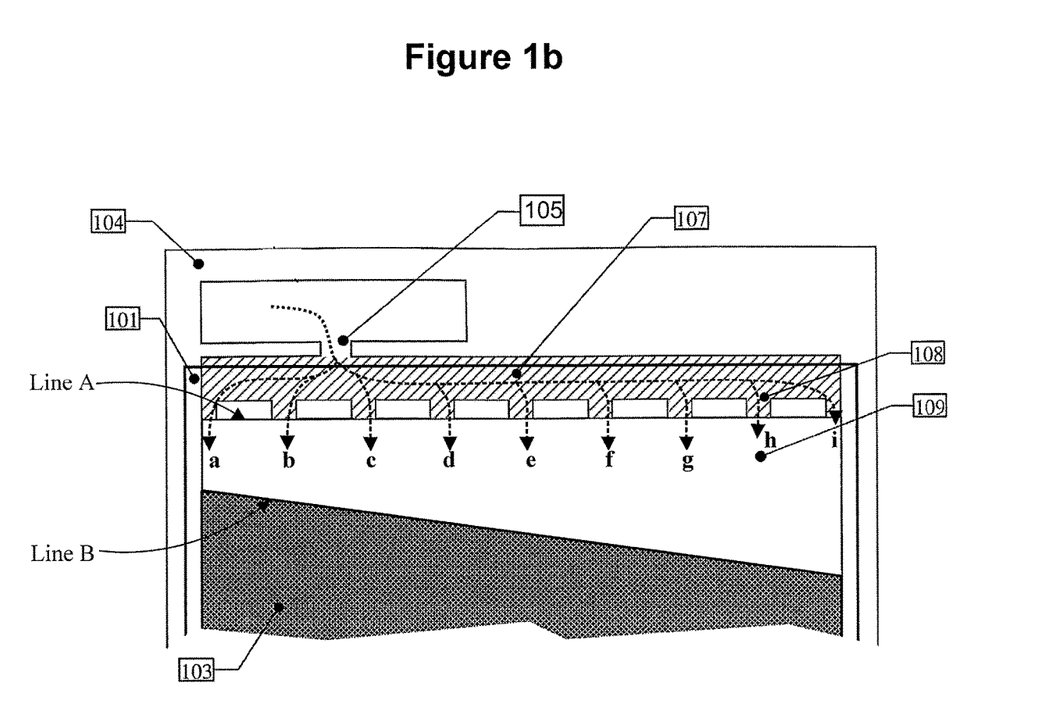
Figure 1C:
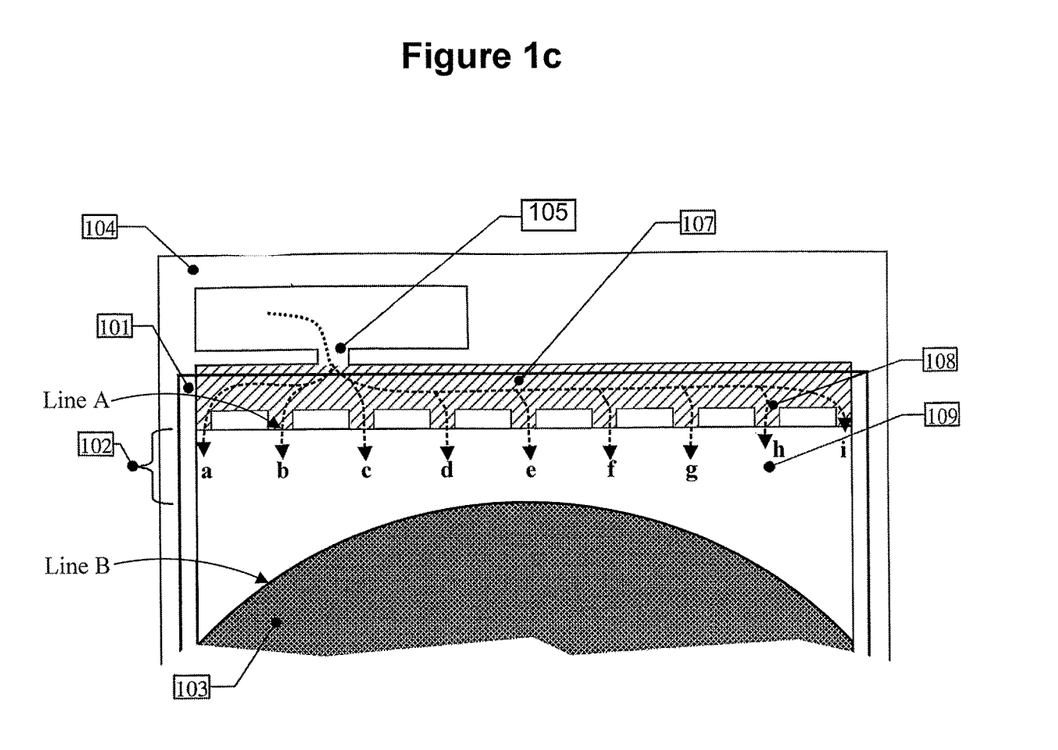

For example, FIG. 1b shows an embodiment differing from the embodiment depicted in FIG. 1a in that Line B in FIG. 1b is slanted downward away from Line A. Consequently, only opening 108a has the shortest distance to Line B. In FIG. 1c, Line B is a semicircle, and only opening 108e has the shortest distance to Line B in the embodiment depicted in this figure. The variations of the positional relations between the inlet of the anode compartment and the anode are numerous. Nevertheless, there is only one unique value for the shortest distance between any of the one or more inlets of the anode compartment to the anode.

Figure 2:
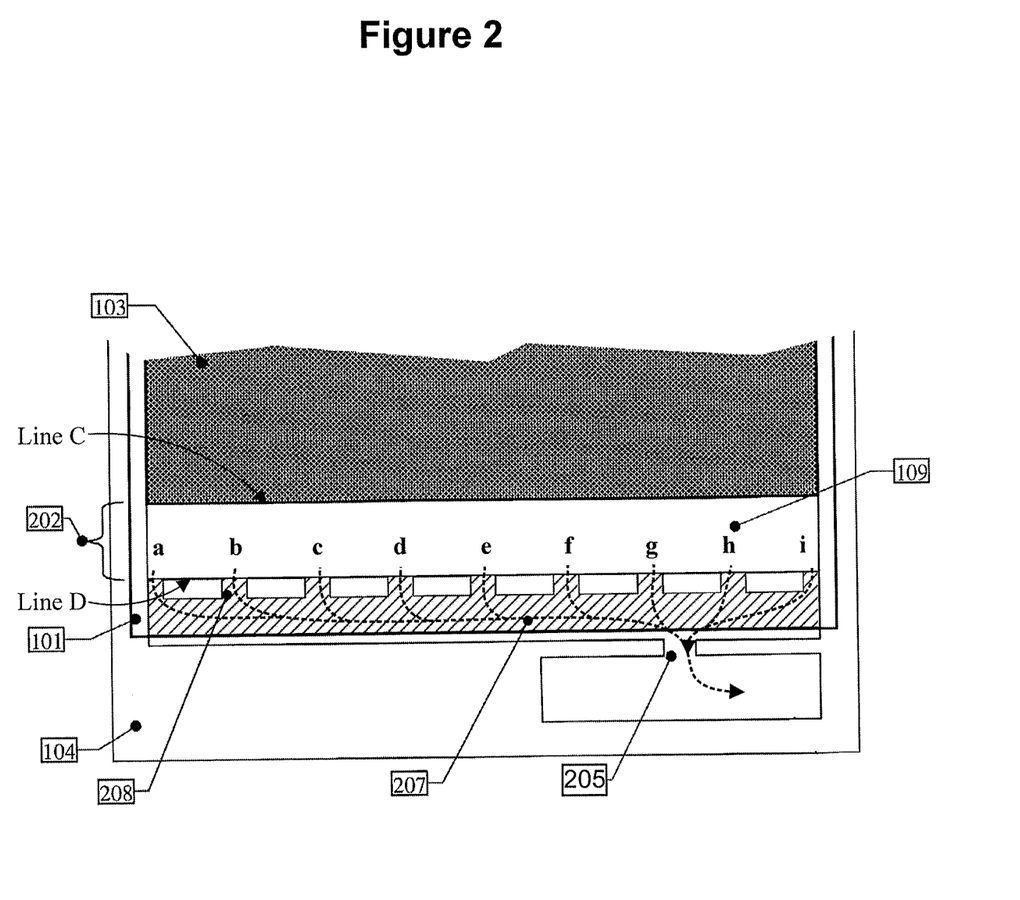
FIG. 2 illustrates another embodiment of the fuel cell stack.

FIG. 2 shows another embodiment in the fuel cell stack according to this disclosure. The same parts in FIG. 1a and FIG. 2 are labeled with the same numbers. The shaded area 207 represents a channel with openings 208a-208i to the anode compartment 109. The openings 208a-208i are the outlet of the anode compartment. The gas from the anode compartment 109 enters the channel 207 through openings 208a-208i and exits the gasket 104 through opening 205. In this embodiment, the periphery of the anode 103, line C, is separated from Line D, where the tips of all the openings 208a-208i reside. In this case, Line C and Line D are substantially parallel so that the shortest distance between them is an imaginary line perpendicular to both Line C and Line D, the length of which is shown as 202.

The space between the inlets to the anode compartment and the anode may be filled with an open flowfield or left empty, creating a buffer zone in between. Since the anode gas enters the anode compartment through discrete inlets, the distribution of gas in the immediate vicinity of the inlets can be uneven. Without being bound to any particular theory, creating a buffer zone may allow the multiple anode gas streams to mix and develop into a more homogenous flow before coming into contact with the anode, which enhances the performance of the fuel cell. On the other hand, the buffer zone between the anode and the outlets of the anode compartment may benefit the performance of fuel cell by allowing liquid water to accumulate in the inert area of the ECP, therefore reducing the unwanted electrochemical reactions in that area.

Figure 3:
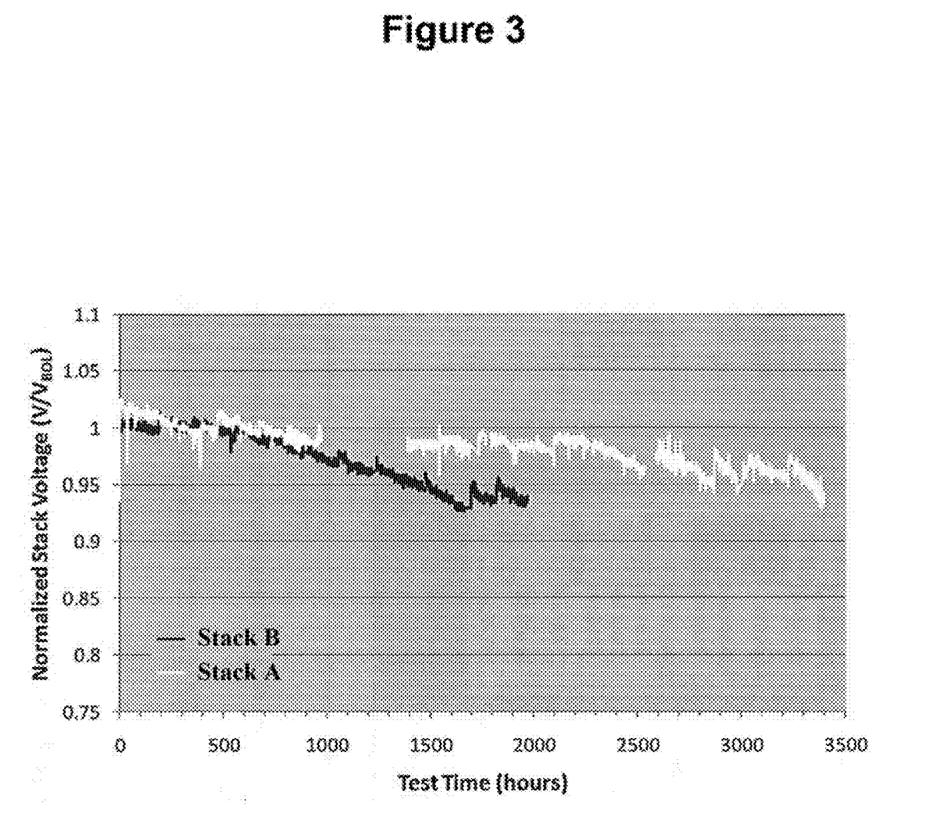
FIG. 3 presents experimental data comparing the performance of fuel cell stacks.

FIG. 3 shows the stack voltage of a fuel cell stack in which there is an inert area between the inlet of the anode compartment and the anode (Stack A) in comparison to one in which the anode is immediately adjacent to the inlet of the anode compartment (Stack B). It was noticed that Stack A was in operation for about 3400 hrs before its stack voltage was lowered to about 0.93 relative to the value at beginning of life. Stack B, however, ran only about 2000 hrs before its stack voltage was dropped to about 0.93 relative to the value at beginning of life.

It will be apparent to those skilled in the art that various modifications and variations can be made without departing from the spirit of the invention. The present invention covers all such modifications and variations, provided they come within the scope of the claims and their equivalents.

We claim:

1. A polymer electrolyte membrane fuel cell stack, comprising fuel cells comprising:
    a first bipolar plate;
    a second bipolar plate;
    an electrochemical package interposed between the first bipolar plate and the second bipolar plate, the electrochemical package comprising a cathode, an anode, and a polymer membrane interposed between the cathode and the anode;
    an anode compartment comprising a space defined by a first gasket disposed between the first bipolar plate and the electrochemical package, the anode compartment comprising a plurality of inlets and a plurality of outlets;
    a cathode compartment comprising a space defined by a second gasket disposed between the second bipolar plate and the electrochemical package, the cathode compartment comprising a plurality of inlets and a plurality of outlets; and
    at least one open flowfield disposed inside at least one of the anode compartment and the cathode compartment,
    a channel that extends parallel along a width of the anode compartment and fluidly connects to the plurality of inlets of the anode compartment,
    wherein the geometric area of the polymer membrane disposed within the anode compartment is larger than the geometric area of the anode disposed within the anode compartment,
    wherein the geometric area of the anode compartment is larger than the geometric area of the anode, whereby at least one buffer zone is created in the anode compartment between the plurality of inlets of the anode compartment and the anode, and the buffer zone extends the width of the anode compartment, and
    wherein geometric area is measured in a planar direction between any of the inlets of the anode compartment and any of the outlets of the anode compartment.

2. The fuel cell stack of claim 1, wherein a shortest planar distance parallel to a plane of the anode compartment between any of the plurality of inlets of the anode compartment and the anode is m, a shortest planar distance parallel to the plane of the anode compartment between the same inlet of the anode compartment to any of the plurality of outlets of the anode compartment is L, and m/L ranges from 1% to 30%.

3. The fuel cell stack of claim 2, wherein m/L ranges from 2% to 25%.

4. The fuel cell stack of claim 2, wherein m/L ranges from 4% to 15%.

5. The fuel cell stack of claim 1, wherein a shortest planar distance parallel to the plane of the anode compartment between any one of the plurality of outlets of the anode compartment and the anode is n, a shortest planar distance parallel to the plane of the anode compartment between any of the plurality of inlets of the anode compartment to the same outlet of the anode compartment is L, and n/L ranges from 1% to 30%.

6. The fuel cell stack of claim 5, wherein n/L ranges from 1% to 15%.

7. The fuel cell stack of claim 5, wherein n/L ranges from 2% to 10%.

8. The fuel cell stack of claim 1, wherein the open flowfield is disposed inside the anode compartment.

9. The fuel cell stack of claim 8, wherein the open flowfield is chosen from a formed metal sheet with perforations, a metal foam, a graphite foam, an expanded metal mesh, a metal wire mesh, and a sintered porous metal sheet.

10. The fuel cell stack of claim 9, wherein the open flowfield comprises at least two materials chosen from a formed metal sheet with perforations, a metal foam, a graphite foam, an expanded metal mesh, a metal wire mesh, and a sintered porous metal sheet.

11. The fuel cell stack of claim 1, wherein the first bipolar plate is a formed metal sheet without perforations.

12. The fuel cell stack of claim 11, wherein the formed metal sheet without perforations further comprises protrusions in direct contact with the anode.

13. The fuel cell stack of claim 1, wherein the open flowfield is disposed inside the cathode compartment.

14. The fuel cell stack of claim 1, wherein the geometric area of the cathode equals the geometric area of the anode.

15. The fuel cell stack of claim 1, wherein the geometric shape of the anode compartment is substantially rectangular, having at least one inlet at one side of the rectangle and at least one outlet at the opposite side of the rectangle.

16. The fuel cell stack of claim 1, wherein the geometric shape of the anode compartment is curvilinear.

17. The fuel cell stack of claim 1, wherein the geometric area of the anode compartment ranges from 2 $cm^2$ to 2400 $cm^2$.

18. The fuel cell stack of claim 1, wherein the geometric area of the anode ranges from 2 $cm^2$ to 2000 $cm^2$.

19. A polymer electrolyte membrane fuel cell stack, comprising fuel cells comprising:
a first bipolar plate;
a second bipolar plate;
an electrochemical package interposed between the first bipolar plate and the second bipolar plate, the electrochemical package comprising a cathode, an anode, and a polymer membrane interposed between the cathode and the anode;
an anode compartment comprising a space defined by a first gasket disposed between the first bipolar plate and the electrochemical package, the anode compartment comprising a plurality of inlets and a plurality of outlets;
a cathode compartment comprising a space defined by a second gasket disposed between the second bipolar plate and the electrochemical package, the cathode compartment comprising a plurality of inlets and a plurality of outlets; and
at least one open flowfield disposed inside at least one of the anode compartment and the cathode compartment, a channel that extends parallel along a width of the cathode compartment and fluidly connects to the plurality of inlets of the cathode compartment,
wherein the geometric area of the cathode compartment is larger than the geometric area of the cathode, whereby at least one buffer zone is created in the cathode compartment between the plurality of inlets of the cathode compartment and the cathode, and the buffer zone extends the width of the cathode compartment, and
wherein geometric area is measured in a planar direction between any of the inlets of the cathode compartment and any of the outlets of the cathode compartment.

20. The fuel cell stack of claim 19, wherein a shortest planar distance parallel to a plane of the cathode compartment between any of the plurality of inlets of the cathode compartment and the cathode is m, a shortest planar distance parallel to the plane of the cathode compartment between the same inlet of the cathode compartment to any of the plurality of outlets of the cathode compartment is L, and m/L ranges from 1% to 30%.

21. The fuel cell stack of claim 20, wherein m/L ranges from 2% to 25%.

22. The fuel cell stack of claim 20, wherein m/L ranges from 4% to 15%.

23. The fuel cell stack of claim 19, wherein a shortest planar distance parallel to the plane of the cathode compartment between any one of the plurality of outlets of the cathode compartment and the cathode is n, a shortest planar distance parallel to the plane of the cathode compartment between any of the plurality of inlets of the cathode compartment to the same outlet of the cathode compartment is L, and n/L ranges from 1% to 30%.

24. The fuel cell stack of claim 23, wherein n/L ranges from 1% to 15%.

25. The fuel cell stack of claim 23, wherein n/L ranges from 2% to 10%.

26. The fuel cell stack of claim 19, wherein the open flowfield is disposed inside the cathode compartment.

27. The fuel cell stack of claim 26, wherein the open flowfield is chosen from a formed metal sheet with perforations, a metal foam, a graphite foam, an expanded metal mesh, a metal wire mesh, and a sintered porous metal sheet.

28. The fuel cell stack of claim 27, wherein the open flowfield comprises at least two materials chosen from a formed metal sheet with perforations, a metal foam, a graphite foam, an expanded metal mesh, a metal wire mesh, and a sintered porous metal sheet.

29. The fuel cell stack of claim 19, wherein the first bipolar plate is a formed metal sheet without perforations.

30. The fuel cell stack of claim 29, wherein the formed metal sheet without perforations further comprises protrusions in direct contact with the cathode.

31. The fuel cell stack of claim 19, wherein the open flowfield is disposed inside the anode compartment.

32. The fuel cell stack of claim 19, wherein the geometric area of the anode equals the geometric area of the cathode.

33. The fuel cell stack of claim 19, wherein the geometric shape of the cathode compartment is substantially rectangular, having at least one inlet at one side of the rectangle and at least one outlet at the opposite side of the rectangle.

34. The fuel cell stack of claim 19, wherein the geometric shape of the cathode compartment is curvilinear.

35. The fuel cell stack of claim 19, wherein the geometric area of the cathode compartment ranges from 2 $cm^2$ to 2400 $cm^2$.

36. The fuel cell stack of claim 19, wherein the geometric area of the cathode ranges from 2 cm² to 2000 cm².

\* \* \* \* \*

UNITED STATES PATENT AND TRADEMARK OFFICE
CERTIFICATE OF CORRECTION

PATENT NO. : 10,581,089 B2
APPLICATION NO. : 12/722051
DATED : March 3, 2020
INVENTOR(S) : Scott Blanchet et al.

It is certified that error appears in the above-identified patent and that said Letters Patent is hereby corrected as shown below:

On the Title Page

Column 1, above "Inventors," insert:
--(71) Applicant: Nuvera Fuel Cells, LLC, Billerica, MA (US)--.

Signed and Sealed this
Thirteenth Day of June, 2023

Katherine Kelly Vidal
*Director of the United States Patent and Trademark Office*